United States Patent
Venkatesan et al.

[11] Patent Number: 4,728,586
[45] Date of Patent: Mar. 1, 1988

[54] ENHANCED CHARGE RETENTION ELECTROCHEMICAL HYDROGEN STORAGE ALLOYS AND AN ENHANCED CHARGE RETENTION ELECTROCHEMICAL CELL

[75] Inventors: Srini Venkatesan, Southfield; Benjamin Reichman, Birmingham; Michael A. Fetcenko, Royal Oak, all of Mich.

[73] Assignee: Energy Conversion Devices, Inc., Troy, Mich.

[21] Appl. No.: 947,162

[22] Filed: Dec. 29, 1986

[51] Int. Cl.⁴ .................. H01M 4/86; H01M 10/34; H01M 12/06

[52] U.S. Cl. ...................................... 429/94; 429/101; 429/209; 420/900

[58] Field of Search .................. 429/101, 94, 209; 420/900

[56] References Cited

U.S. PATENT DOCUMENTS

| | | | |
|---|---|---|---|
| 4,551,400 | 11/1985 | Sapru et al. | 429/101 |
| 4,605,603 | 8/1986 | Kanda et al. | 429/101 |
| 4,621,034 | 11/1986 | Kanda et al. | 429/101 |
| 4,623,597 | 11/1986 | Sapru et al. | 429/101 |
| 4,637,967 | 1/1987 | Keem et al. | 429/101 |

FOREIGN PATENT DOCUMENTS 3023770 11/1983 Fed. Rep. of Germany ...... 420/900

Primary Examiner—Donald L. Walton
Attorney, Agent, or Firm—Richard M. Goldman; Marvin S. Siskind

[57] ABSTRACT

A high charge retention, reversible, multicomponent, multiphase, electrochemical hydrogen storage alloy comprising titanium, vanadium, zirconium, nickel, and chromium. The hydrogen storage alloy is capable of electrochemically charging and discharging hydrogen in alkaline aqueous media. In one preferred exemplification the hydrogen storage alloy comprises $$(Ti_{2-x}Zr_xV_{4-y}Ni_y)_{1-z}Cr_z$$

where 0.0 is less than x is less than 1.5, 0.6 is less than y is less than 3.5, and z is an effective amount less than 0.20. Also disclosed is a rechargeable, electrochemical cell utilizing a negative electrode formed of the alloy.

59 Claims, 5 Drawing Figures

ENHANCED CHARGE RETENTION ELECTROCHEMICAL HYDROGEN STORAGE ALLOYS AND AN ENHANCED CHARGE RETENTION ELECTROCHEMICAL CELL

FIELD OF THE INVENTION

The present invention relates to rechargeable electrochemical cells. More particularly, the invention relates to rechargeable batteries having hydrogen storage negative electrodes and to the hydrogen storage negative electrodes for the cells.

BACKGROUND OF THE INVENTION

Secondary batteries using a hydrogen rechargeable negative electrode are known in the art. These batteries operate in a different manner than lead acid, nickel-cadmium or other battery systems. The rechargeable hydrogen storage electrochemical cell or battery utilizes a negative electrode that is capable of reversibly electrochemically storing hydrogen and usually employs a positive electrode of nickel hydroxide material, although other positive materials may be used. The negative and positive electrodes are spaced apart in an alkaline electrolyte, which may include a suitable separator membrane.

Upon application of an electrical current to the negative electrode, the negative electrode material (M) is charged by the absorption of hydrogen:

$$M + H_2O + e^- \rightarrow M-H + OH^- \text{ (Charging)}$$

Upon discharge, the stored hydrogen is released to provide an electric current:

$$M-H + OH^- \rightarrow M + H_2O + e^- \text{ (Discharging)}$$

The reactions are reversible.

The reactions that take place at the positive electrode are also reversible. For example, the reactions at a conventional nickel hydroxide positive electrode as utilized in a hydrogen rechargeable secondary cell or battery are:

$$Ni(OH)_2 + OH^- \rightarrow NiOOH + H_2O + e^-$$

(Charging)

$$NiOOH + H_2O + e^- \rightarrow Ni(OH)_2 + OH^-$$

(Discharging).

A battery utilizing an electrochemically rechargeable hydrogen storage negative electrode can offer important potential advantages over conventional secondary batteries. Hydrogen rechargeable negative electrodes offer significantly higher specific charge capacities than lead or cadmium negative electrodes. A higher energy density is possible with hydrogen storage batteries than with these conventional systems, making hydrogen storage batteries particularly suitable for many commercial applications.

Suitable active materials for the negative electrode are disclosed in U.S. Pat. No. 4,551,400 to Sapru et al, incorporated herein by reference. These materials reversibly form hydrides in order to store hydrogen. The materials of Sapru et al have compositions of:

$$(TiV_{2-x}Ni_x)_{1-y}M_y$$

where 0.2 x 1.0, 0 y 0.2 and $M =$ Al or Zr;

$$Ti_{2-x}Zr_xV_{4-y}Ni_y$$

where, 0 x 1.5, 0.6 y 3.5; and $$Ti_{1-x}Cr_xV_{2-y}Ni_y$$

where, 0 x 0.75, 0.2 y 1.0.

Reference may be made to U.S. Pat. No. 4,551,400 for further descriptions of such materials and for methods of making them. Other suitable materials may also be used for the rechargeable hydrogen storage negative electrode.

One problem that has been encountered in rechargeable batteries is charge retention, also referred to as self discharge. Charge retention, or self discharge, describes the condition where an electrochemical cell loses stored energy over time through internal discharge mechanisms. While this problem is common to cells utilizing both cadmium negative electrodes and to hydrogen storage negative electrodes, it has heretofore been a greater problem with hydrogen storage negative electrodes. For example, while a typical nickel-cadmium cell loses about ten percent of its stored charge over a period of about one week at ambient temperatures, a cell utilizing a prior art metal hydride negative electrode, i.e., a prior art hydrogen storage negative electrode, may lose as much as thirty five percent of its stored charge over the same period. Furthermore, a cell utilizing a prior art metal hydride negative electrode tends to worsen in charge retention after cycling. This condition has been termed "aging". It is possible for a cell having a metal hydride hydrogen storage negative electrode typical of the prior art which initially loses charge at a rate of twenty five to thirty five percent per week, to lose charge at a rate greater than sixty percent per week after charge discharge cycling.

Self discharge in nickel-cadmium cells is generally attributable to two dominant mechanisms. One is related to oxygen evolution at the positive electrode, and the other is related to the presence of residual impurities, like nitrates, which act as a redox couple. These residual nitrate impurities are introduced into the positive electrode during fabrication.

The first mechanism relates to chemical instability of the positive (nickel hydroxide) electrode. Under normal circumstances, a nickel hydroxide positive electrode evolves oxygen at high states of charge and during overcharge. For sealed cells this condition is utilized to provide an overcharge reaction. The oxygen produced at the end of charge of the nickel hydroxide positive electrode recombines at the cadmium negative electrode to form cadmium oxides or hydroxides. This reaction can be chemical or electrochemical. The process can be sustained indefinitely. This oxygen recombination reaction can be thought of as a discharge mechanism to balance the charging mechanism during overcharge.

Ideally, when the overcharge current is removed, oxygen evolution should cease. However, practically it is possible for oxygen to be evolved for some time after the charge current is removed. The formation of high valence, non-stoichiometric nickel hydroxides/oxides and surface impurities are known to contribute to oxygen evolution. This evolved oxygen can also migrate to the negative electrode, and without additional charge current, discharge the cell. The degree of this reaction is small, but variable, usually attributed to about 3% to 5% capacity loss (of the overall 10 percent capacity loss) in one week. This reaction is also related to the state of charge of the nickel hydroxide; so as the cell is discharged by this reaction, and the possible electrode state of charge is reduced, the reaction becomes virtually negligible.

The second reaction mechanism generally associated with self discharge in nickel-cadmium cells is commonly referred to as the "nitrate shuttle". At various stages of positive nickel hydroxide electrode fabrication, it is possible for nitrate ions to be unintentionally incorporated into the positive electrode and carried into the cell. These residual nitrate ions, together with the reduced form (nitrite), are the basis of the redox shuttle mechanism. Nitrites diffuse through the electrolyte to be oxidized to nitrates at the positive electrode and then diffuse back through the electrolyte to be reduced to nitrites at the negative electrode. This nitrate-nitrite redox couple effectively reduces cell capacity during this process. It has been reported that very low concentrations of nitrate impurities, on the order of 200 parts per million, can be associated with generally observed self discharge rates in nickel-cadmium cells.

It is probable that these two mechanisms are also present in cells having hydrogen storage negative electrodes, although to possibly different degrees than that found in nickel-cadmium cells. As a practical matter, it is difficult to quantify individual degrees for each reaction in relation to the overall self discharge rate. Moreover, it is also likely that additional mechanisms for self discharge can exist in cells utilizing prior art metal hydride negative electrodes in place of cadmium negative electrodes.

Nickel hydroxide positive electrodes are also used in cells having hydrogen storage negative electrodes. One goal of positive electrode fabrication (to achieve high energy density cells) is to provide an electrode that is more heavily loaded in nickel hydroxide. It is possible that a nickel hydroxide positive electrode which is heavily loaded in nickel hydroxide for use with a hydrogen storage counter electrode may have a greater tendency towards oxygen evolution, which would increase the rate of self discharge in a cell.

The level of nitrate ion impurities incorporated in more heavily loaded positive electrodes is greater than that found in nickel-cadmium cells. The fabrication processes used for producing these positive electrodes are similar to those used for conventional nickel cadmium batteries. However, because of the high loading of the electrodes, it is possible for the high capacity nickel hydroxide positive electrodes to introduce higher concentrations of nitrate impurities. These higher levels of residual nitrate impurities, coupled with heavily loaded nickel hydroxide electrodes, are less efficiently removed during processing than is the case with prior art low capacity nickel hydroxide positive electrodes. Like the chemical stability of the positive electrode, it is difficult to quantify the degree of this specific self discharge mechanism in the presence of other self discharge mechanisms.

We have observed, for example, that some of hydrogen storage electrode materials of U.S. Pat. No. 4,551,400 to Sapru et al, while characterized by high capacity, high charge rates, high discharge rates under load, and high cycle life, are also highly susceptible to high rates of self discharge. The overall self discharge rate is probably influenced by both the chemical instability of the positive electrode and the nitrate ion redox mechanism.

The nitrate impurity appears to increase self discharge by a nitrate shuttle self discharge mechanism. This nitrate shuttle self discharge mechanism is specifically an oxidation/reduction, or redox, mechanism. The nitrate ion impurity incorporated in and introduced through the positive electrode has the electrochemical property of being able to exist as a nitrate ion ($NO_3^-$), or as a nitrite ($NO_2^-$) ion. The mechanism can be basically stated in the following manner. Nitrate ions are initially present in a cell as residual impurities from the positive electrode fabrication process. These residual nitrate ions are only present in small quantities, typically in the range of 200 parts per million. These nitrate ions diffuse through the alkaline electrolyte to the negative electrode, which can be a cadmium or metal hydride electrode. At the negative electrode the nitrate ion ($NO_3^-$) is electrochemically reduced to nitrite ion ($NO_2^-$). The reduction step at the negative electrode lowers the stored charge of the negative electrode. The reduced nitrite ion ($N_2^-$) then diffuses to the positive nickel hydroxide electrode where it is oxidized back to nitrate ($NO_3^-$). Thus, this process is essentially cyclical, and over time, can ultimately self discharge all of the stored energy in the cell.

The nitrate shuttle self discharge process is affected by several factors. The concentration of nitrate impurities is important. If variations occur in the fabrication of the nickel hydroxide electrode, it is possible for the level (concentration) of residual nitrates to be very high. Moreover, because the nitrate shuttle is a diffusion process, the physical geometry of the cell is also important. The electrolyte level within the cell and the distance between the positive and negative electrodes are important, as well as separator qualities like porosity, pore size, and thickness. For a cell utilizing a metal hydride, hydrogen storage negative electrode, the construction may be of a jelly roll configuration, with a starved electrolyte, and a 0.008" distance between the two electrodes, and separated by a nonwoven nylon separator. These conditions are essentially the same as in a conventional nickel-cadmium cell.

The nitrate shuttle self discharge process is also affected by kinetic and thermodynamic considerations. High temperatures will increase the diffusion rate of the nitrate ions and the reaction rate of the redox reactions. The shuttle process is also affected by thermodynamic considerations, or state of charge. This means that the reaction is faster when the electrodes are at higher states of charge. Finally, it must be noted that the redox mechanism is actually an oxidation reaction at the positive electrode and a reduction reaction at the negative electrode. Consequently, the shuttle reaction can be affected by the surface characteristics of both electrodes; namely surface area, surface morphology, and catalytic nature.

Some hydrogen storage negative electrodes, e.g., hydrogen storage electrodes of the V-Ti-Zr-Ni type, may be manufactured to have very high surface areas. These large surface areas provide enhanced electrochemical properties. However, the high rates of self discharge for the V-Ti-Zr-Ni family materials may be at least partly due to the same higher surface area. This is because the higher surface area that provides enhanced electrochemical properties also provides greater reaction surface for the nitrate to nitrite reduction reaction.

For the materials of type V-Ti-Zr-Ni, the self discharge rate may also be high due to the type of surface. The nitrate to nitrite reduction mechanism appears to be accelerated in the V-Ti-Zr-Ni materials. This could be due to a higher concentration of conductive components at the metal/electrolyte interface. The higher concentration of metallic components, specifically nickel, in the alkaline electrolyte medium, may be catalytic to the nitrate reduction mechanism.

It is also possible that the type of surface present at the metal hydride negative electrode may be more favorable to other redox mechanisms than the surface of cadmium electrodes. In addition to oxygen produced at the positive electrode during overcharge, oxygen can also be dissolved in the electrolyte. The oxygen may diffuse through the thin layer of electrolyte present in starved cells to the negative electrode, where it may be electrochemically reduced to form peroxide ions or hydroxyl ions according to:

$$O_2 + 2e^- + H_2O \rightarrow HO_2^- + OH^-$$

or $$O_2 + 4e^- + 2H_2O \rightarrow 4OH^-$$

The nature of the reaction path and the rate of reaction are highly dependent on the catalytic activity of the reaction surface. It is possible that the surface present with a metal hydride electrode has a suitable catalytic surface for these reactions. Since $HO_2^-$ ions may diffuse to the positive electrode to be oxidized, and then repeat the reduction process at the negative electrode, the rate of self discharge may be affected.

Another impurity ion redox self discharge mechanism appears to be associated with the vanadium component introduced into a cell utilizing metal hydride negative electrodes of the type V-Ti-Zr-Ni, by the vanadium-containing metal hydride negative electrode disclosed in U.S. Pat. No. 4,551,400.

It is likely that vanadium is present in the alkaline electrolyte predominantly in its +5 oxidation state, and acts in a redox mechanism which contributes to self discharge in the cell. Vanadium is easily oxidized in the highly alkaline medium used in commercially practical electrochemical cells (30% potassium hydroxide in water). Once the vanadium is oxidized at the metal/electrolyte surface, the vanadium pentoxide oxidation product is readily soluble in the electrolyte.

A vanadium oxide shuttle mechanism occurs between the +4 and +5 oxidation states of vanadium. Both oxidation states are stable in aqueous alkaline media at the potentials present in the rechargeable cell utilizing a metal hydride negative electrode and a nickel hydroxide positive electrode. In the proposed vanadium shuttle, the $V^{+5}$ component diffuses to the negative electrode where it is reduced to the $V^{+4}$ oxidation state. Similarly, the $V^{+4}$ component diffuses to the positive nickel hydroxide electrode where it is oxidized back to the $V^{+5}$ oxidation state. Many of the factors of importance to the nitrate-nitrite redox couple mechanism are believed to be important for governing the rate of the vanadium (+4)-vanadium (+5) redox couple mechanism, e.g., concentration of vanadium oxides, physical aspects of cell construction, temperature, state of charge, and reaction surfaces of both electrodes.

The addition of vanadium oxide to the alkaline electrolyte has been demonstrated to increase the self discharge rate of commercially available nickel-cadmium cells. A standard nickel-cadmium cell having a self discharge rate of 10% loss in one week, was measured to have increased in self discharge rate upon the deliberate addition of vanadium pentoxide to the electrolyte. This experiment is shown in the examples.

A strong motivation for using the V-Ti-Zr-Ni family of electrochemical hydrogen storage alloys is the inherently higher discharge rate capability under load compared to materials of the V-Ti-Cr-Ni type. An important physical quality in this regard is substantially higher surface areas for the V-Ti-Zr-Ni materials. Measured in surface roughness (total surface area divided by geometric surface area), the V-Ti-Zr-Ni materials can have roughnesses of about 10,000, compared to about 3000 for some materials such as those of the V-Ti-Cr-Ni type. The very high surface area plays an important role in the inherently high rate capability of these materials. However, it is possible that the same increase in electrode surface area which contributes to inherently higher discharge rate capability under load for these materials may also contribute to higher rate of self discharge. For both the nitrate redox shuttle and the vanadium redox shuttle, the reaction rate at the negative electrode appears to have properties that are consistent with a surface catalyzed reduction. The high surface area of the V-Ti-Zr-Ni negative electrode hydrogen storage materials may promote the reduction step of the redox reaction, and the concomitant overall self discharge rate.

The metal/electrolyte interface also has a characteristic roughness. The characteristic surface roughness for a given negative electrode electrochemical hydrogen storage material is important because of the interaction of the physical and chemical properties of the host metals in an alkaline environment. The oxidation and corrosion characteristics of the host elements of the electrochemical hydrogen storage material are believed to be important in determining the oxidation and corrosion characteristics of the hydrogen storage material. Since all of the elements are present throughout the metal, they are also represented at the surfaces and at cracks which form the metal/electrolyte interface. For example, while vanadium corrodes easily, forming oxides which have a high solubility in the alkaline electrolyte, the oxides of titanium and zirconium are quite insoluble. For this reason titanium and zirconium do not corrode. Nickel is stable in its metallic state, by forming a thin passive oxide at the metal/electrolyte interface.

However, we have observed a high degree of vanadium corrosion in alkaline aqueous media from surfaces of hydrogen storage negative electrodes fabricated of vanadium, titanium, zirconium, and nickel. The titanium, zirconium, and nickel components of the hydrogen storage alloy do not seem to provide any degree of passive protection to the vanadium. Thus, titanium oxide, zirconium oxide, and metallic nickel apparently do not inhibit vanadium corrosion substantially. In fact, it has been observed that these reaction products are found as particles or colloidal suspensions during vanadium oxide corrosion.

On a microscopic scale, there appears to be little evidence of a self limiting corrosion process at the hydrogen storage electrode - electrolyte interface. Thus, with time, the surface increases its roughness. That is, a given unit surface area becomes rougher due to the corrosive properties of its constituent oxides, and the leaching and dissolution of these oxides as solids increases the overall surface area. Additional surface area, whether created through crack propagation or corrosion and/or erosion, promotes the reduction step of ion shuttle redox mechanisms, thus increasing self discharge.

In addition to the physical nature of the roughened surface, it has been observed that the V-Ti-Zr-Ni materials reach a steady state surface condition. This steady state surface condition is characterized by a relatively high concentration of nickel. The surface nickel is in the metallic state. These observations are consistent with a relatively high rate of removal of the oxides of titanium and zirconium from the surface and a much lower rate of nickel removal during vanadium corrosion. The resultant surface seems to have a higher concentration of nickel than would be expected from the bulk composition of the negative hydrogen storage electrode. Nickel in the metallic state is electrically conductive and catalytic, imparting these properties to the surface. As a result, the surface of the negative hydrogen storage electrode is more catalytic and conductive than if the surface contained a higher concentration of insulating oxides.

The surface, having a conductive and catalytic component, e.g., the metallic nickel, appears to assist the reduction step of the redox ion shuttle mechanism by catalyzing the reduction reaction.

Thus, the four component system which gives rise to high charge capacity, a high charge rate, and a high discharge rate under load, also gives rise to a high self discharge rate and a high aging, or degradation, effect.

Aging effect refers to the condition of the cell having a metal hydride negative electrode where the self discharge rate for a given cell increases after electrochemical cycling. For example, a prior art cell with a self discharge rate of about 25% loss in capacity per week at 25 degrees Celsius may increase to over 50% loss in 1 week after only 50 electrochemical cycles. No such effect is present in conventional nickel-cadmium cells.

It is believed that many of the same conditions which contribute to the initial self discharge rate are also responsible for the aging effect, or degradation of charge retention after electrochemical cycling.

SUMMARY OF THE INVENTION

The problems of charge retention and aging in hydrogen storage batteries are obviated by the methods, apparatus, and compositions of the invention.

More particularly, the charge retention and aging characteristics of hydrogen storage materials utilized in electrochemical cells and exemplified by the V-Ti-Zr-Ni family of materials are improved by the incorporation of an effective amount of a modifier, i.e., a fifth component into the V-Ti-Zr-Ni system.

The incorporation of a modifier into the hydrogen storage alloy allows the superior overall qualities of the V-Ti-Zr-Ni family (pressure, capacity, rate, cycle life, cost) to be maintained, while significantly improving charge retention. The fifth component appears to improve charge retention by one or more of: inhibiting the corrosion of vanadium from the host matrix, inhibiting unlimited new surface formation, inhibiting the erosion and/or corrosion of oxides of titanium and/or zirconium from the surface, inhibiting the vanadium redox couple mechanism, inhibiting the migration of vanadium to the nickel hydroxide positive electrode; providing a negative electrode surface which is less sensitive to the redox couple reaction mechanisms, such as nitrates, and/or inhibiting the build up of nickel on the negative electrode surface.

This electrochemical hydrogen storage negative electrode material is incorporated into a sealed, rechargeable electrochemical cell, i.e., a secondary battery. The electrochemical cell includes a sealed container, containing positive and negative electrodes in an electrolyte and separated from one another by a separator.

The negative electrode is formed of a multicomponent, multiphase, reversible electrochemical hydrogen storage alloy capable of reversibly electrochemically charging and discharging hydrogen in alkaline aqueous media. In one exemplification the hydrogen storage alloy comprises titanium, vanadium, zirconium, nickel, and chromium. In a particularly preferred exemplification the hydrogen storage alloy has the composition $(Ti_{2-x}Zr_xV_{4-y}Ni_y)_{1-z}Cr_z$ where x is from 0.00 to 1.5, y is from 0.6 to 3.5, and z is an effective amount less then 0.20, and preferably about 0.07.

The positive electrode is a nickel hydroxide electrode, and the separator may be non-woven nylon, e.g., with a thickness of about 0.0085 inches. The electrolyte is an aqueous alkaline electrolyte, e.g., 30 weight percent potassium hydroxide, which may contain up to about 15 grams per liter of lithium hydroxide.

The resulting electrochemical cell has reduced levels of vanadium corrosion products in the electrolyte (with a concomittant reduction in the vanadium redox shuttle and a concommittant increase in the chemical stability of the positive electrode), and exhibits reduced aging and self discharge, even at nitrate concentrations as high as 500 parts per million.

THE FIGURES

The present invention can be more completely understood by reference to the accompanying drawings in which.

Figure 3:
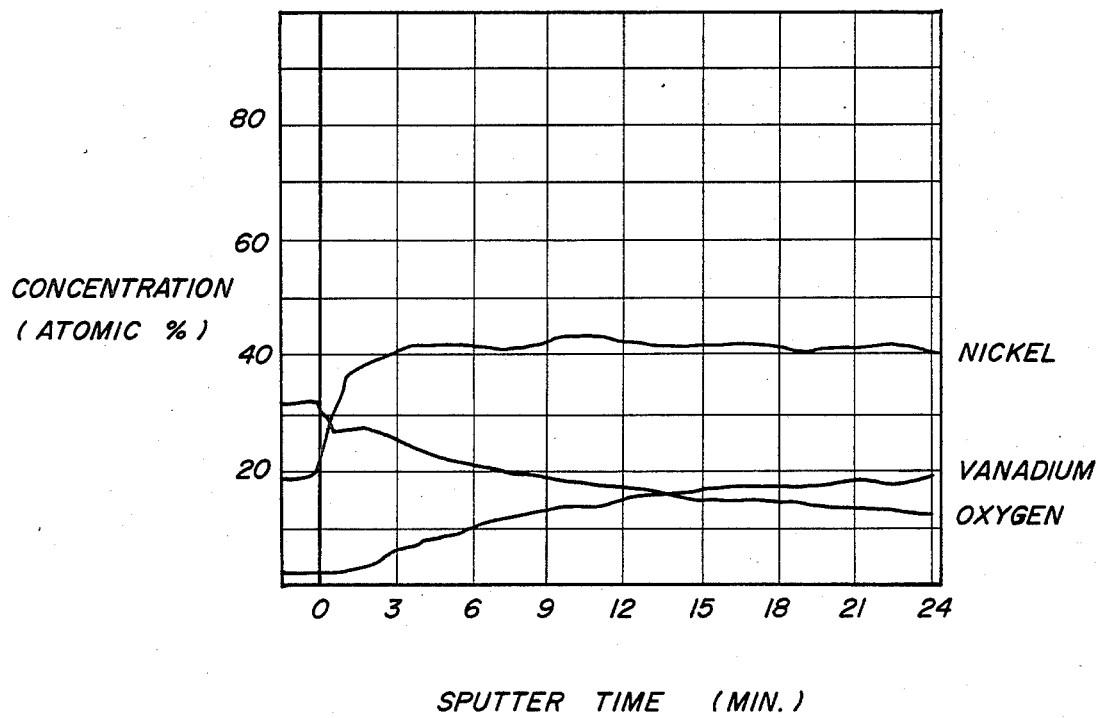
Figure 4:
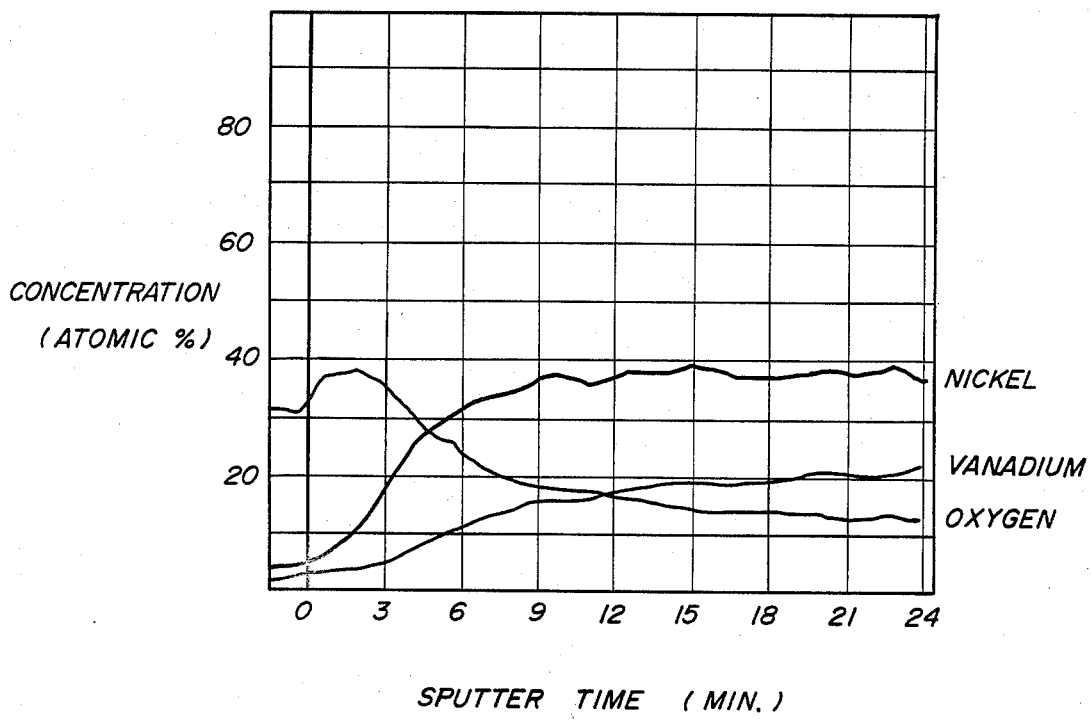
Figure 5:
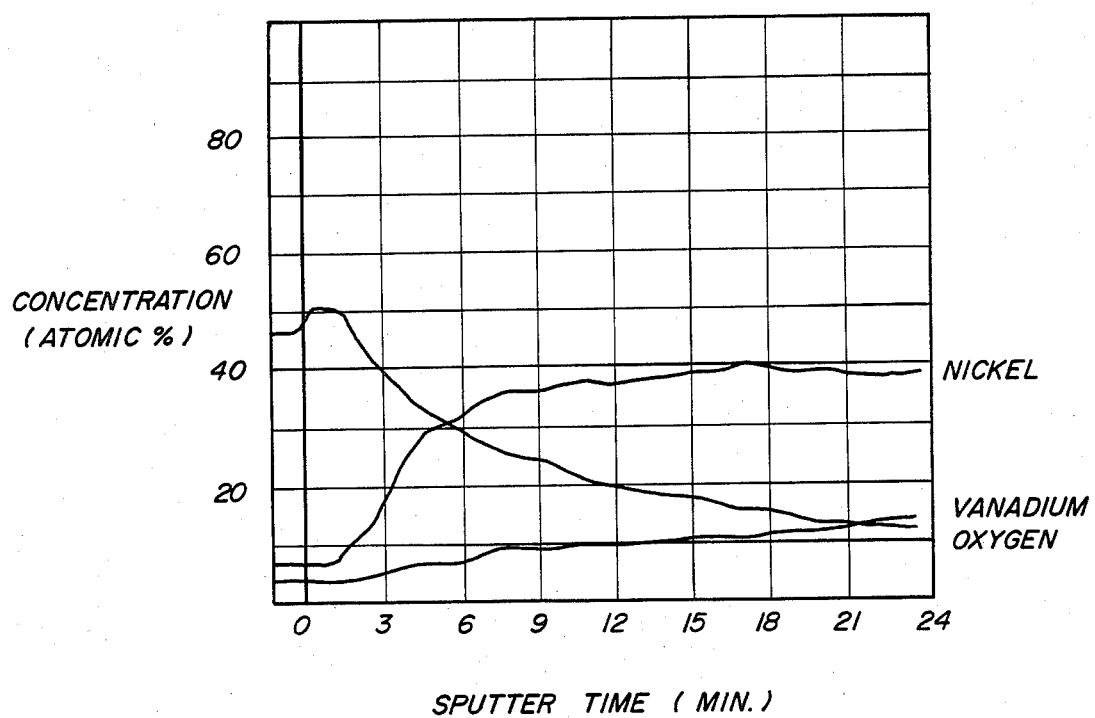

FIGS. 3, 4, and 5 represent AES depth profiles for the surfaces of three analyzed negative electrodes. The ordinate is concentration, measured in atomic percent. The abcissa is labeled in sputter time. For all three profiles, the sputter rate was 41.6 angstroms per minute with respect to a tantalum oxide calibration standard.

DETAILED DESCRIPTION OF THE INVENTION

In accordance with the present invention, the microstructure and composition of the negative hydrogen storage electrode is modified by the addition thereto and incorporation therein of a modifying component. This component preserves the overall desirable quantities of the electrochemical hydrogen storage material while significantly improving the charge retention properties thereof.

While not wishing to be bound by our explanations, various mechanisms are consistent with our observations. For example, the modifier appears to improve charge retention by one or more of: (1) inhibiting the corrosion of vanadium from the host matrix, (2) inhibiting the corrosion and/or the erosion of oxides of titanium and/or zirconium from the electrode surface (thereby avoiding a build-up of nickel as the electrode surface); (3) inhibiting the migration of vanadium to the nickel hydroxide positive electrode (which may cause decreased chemical stability of the positive electrode and increased chemical instability of the positive electrode and increased oxygen evolution); (4) providing a negative electrode surface which is less sensitive to the redox couple reaction mechanisms such as nitrates (the negative surface may be less sensitive to redox reactions through changes in overall electrode surface area and by changes to the physical and chemical structure of the surface oxides which are exposed to the alkaline electrolyte).

One function of the modifier is an alteration of the surface of the negative electrode. One effect of this may be to inhibit reduction reactions at the negative electrode, especially nitrate reduction. It appears that the addition of the modifier to the host material matrix affects the conductive/insulative, or catalytic, qualities of the metal/electrolyte interface in such a manner to reduce the rate of the nitrate to nitrite reduction mechanism at the negative metal hydride electrode surface, and consequently lower the overall rate of self discharge. It is also possible that the negative electrode surface produced according to the invention reduces the catalytic activity of the electrode towards other reduction reactions such as $$O_2 + 2e^- + H_2O \; HO_2^- OH^-$$

or $$O_2 + 4e^- + 2H_2O \; 4OH^-$$

A further aspect of the invention is the modification of the electrochemical hydrogen storage alloy negative electrode material by adding the modifier to the host matrix, thus lowering the level of vanadium oxide in solution. The inhibition of vanadium corrosion by the passivation properties of the modifier at the metal/electrolyte surface substantially reduces the concentration of vanadium oxides in the electrolyte, and the growth of new negative electrode surface area, thereby reducing the rate of the vanadium oxide redox reaction, and thus the overall self discharge rate in the cell.

The modifier further appears to inhibit the corrosion of vanadium from the host metal hydride matrix. This lowers the overall self discharge rate within the cell having a metal hydride negative electrode. Without assuming any degree of self discharge rate reduction, it is believed that this reduction is due to one or more of lowering the rate of the vanadium shuttle mechanism and inhibiting vanadium oxide from causing increased chemical instability at the nickel hydroxide positive electrode.

The modifier may also have the effect of increasing the inherent ductility of the metal matrix. Thus, upon charge/discharge cycling, the material may be more resilient to crack formation. Another way in which the modifier could reduce the growth of surface area may be its lack of hydriding properties. For example, when the modifier is chromium, and a chromium addition is about 7 atomic percent, the chromium partially substitutes for the hydride formers vanadium, titanium, and zirconium. With less inherent hydrogen capacity, it is possible that there is less volumetric expansion and contraction, and therefore less mechanical stress during the charge/discharge cycling.

Moreover, the modifier may have the effect of lowering the available surface area for the reduction side of possible redox couples on a microscopic, localized scale. Thus, while the previous discussion dealt with surface area in macroscopic terms, i.e., crack propagation on a large scale, it is also possible for the local metal/electrolyte interface to have a characteristic roughness. The concept of characteristic roughness relates to the surface roughness being affected by the degree of leaching and dissolution of soluble surface oxides. The modifier inhibits surface corrosion, reducing surface roughness.

Moreover, it appears that by the addition of chromium to the hydrogen storage alloy, the passivation properties of the modifier can inhibit the formation of a surface excessively high in metallic components, e.g., surface catalytic and/or electroconductive components. By providing this passivating layer, and suppressing the formation of surfaces of high nickel concentration, it is believed that the reduction step of ion shuttle mechanisms may be inhibited.

A further aspect of the invention appears to reside in the alteration of the metallurgical properties of the hydrogen storage alloy. The addition of the modifier to the host material alters the host materials' metallurgical properties. It is believed that the modifier has the effect of altering the mechanical properties of the material in such a way that during the excessive stresses of the charge/discharge (hydriding/dehydriding) process, less overall surface area is formed.

Moreover, the addition of the modifier substantially reduces the aging effect. This appears to be the result of inhibiting vanadium corrosion (reducing the effect of the vanadium redox mechanism and inhibiting chemical instability of the positive electrode) and suppressing the growth of new surface area, both on a macroscopic and local scale, inhibiting reduction reactions at the negative electrode.

The modifier may be used in any suitable metal hydride where one or more of the host metal elements has physical or chemical properties resembling vanadium. Examples of such elements are aluminum and niobium. Both metals easily oxidize in an alkaline environment, and the oxides are readily soluble. Specifically, the modifier may be added to any hydrogen storage alloy containing therein those elements which are readily oxidized in an alkaline environment and whose reaction product is prone to corrosion. The modifier prevents the physical aspects of corrosion formation from resulting in surfaces favorable to the reduction side of ion redox couple self discharge mechanisms.

The modifier also inhibits the corrosion of host metal species whose reaction product in alkaline medium has electrochemical properties allowing the formation of a redox couple in an electrochemical cell. These metals are those whose oxides have more than one stable oxidation state under typically used conditions of pH and potential. "Oxidation" also includes the formation of any complex ions having this property, including organic compounds.

A further aspect of the modifier is the suppression of negative electrode corrosion products which might promote chemical instability of a nickel hydroxide positive electrode. This aspect includes suppressing the corrosion of those species which themselves have properties which can promote chemical instability and also suppressing the corrosion of those species which could remove relatively insoluble species, through erosion as colloidal suspensions or particulates, having properties which can promote chemical instability of the positive electrode. One example is iron. It has been reported in the literature that iron can cause charging efficiency problems at a nickel hydroxide electrode even when present at the electrode surface in very small quantities.

According to a particularly preferred exemplification of the invention, the modifier is used in conjunction with electrochemical hydrogen storage alloys of the type $$Ti_{2-x}Zr_xV_{4-y}Ni_y$$

where x is from 0 to 1.5, and preferably from 0.95 to 1.05, and y is from 0.6 to 3.5, and preferably from 2 to 3. A particularly preferred modifier is chromium.

The modified materials have the composition $$(Ti_{2-x}Zr_xV_{4-y}Ni_y)_{1-z}Cr_z$$

where x and y are as defined above, and z is an effective amount to enhance charge retention. This is generally from about 0.01 to about 0.20, and preferably from about 0.05 to about 0.15.

Within these stoichiometric ranges the electrochemical hydrogen storage alloy is a multiphase, polycrystalline structure having enhanced electrochemical charge retention and resistance to vanadium corrosion.

One particularly preferred electrochemical hydrogen storage alloy is $$Ti_{16}Zr_{16}V_{22}Ni_{39}Cr_7.$$

The preferred multiphase polycrystalline structure of the active materials proposed includes a grain phase which is an intermetallic compound of vanadium, titanium, zirconium, and nickel, with dissolved chromium. The grain phase reversibly stores hydrogen and also has suitable catalytic activity to promote rapid hydrogen oxidation. The composition of this grain phase is about 19: 16: 19: 42: 4 as an atomic ratio of vanadium : titanium : zirconium : nickel : chromium.

Between the grain phases of the polycrystalline structure is a primary intergranular phase which is a solid solution of vanadium, chromium, titanium, and nickel. The composition of this intergranular phase is about 65: 27: 3: 5 as an atomic ratio of vanadium : chromium : titanium : nickel. This intergranular phase is believed to be a hydrogen storing phase, with limited catalytic activity for hydrogen oxidation.

Several other phases may be present along with the above mentioned two dominant phases. We have observed that these phases are dependent on the fabrication conditions of the alloy and electrode. Although not wishing to be bound by theory, it is not believed that the degree of these alternate phases play a critical role in performance.

The phase compositions identified above are for the preferred composition. It should be understood that the specific phase compositions for the entire family of $$(Ti_{2-x}Zr_xV_{4-y}Ni_y)_{1-z}Cr_z$$

where x, y, and z have been previously specified, are variable and dependent on the individual composition.

The invention with chromium as a modifier to the V-Ti-Zr-Ni family suggests that chromium should be present in the primary grain phase on the order of from about 0 to 10 atomic percent, and preferably about 4 atomic percent. Chromium should be present in the primary intergranular phase on the order of 0 to 35 atomic percent and preferably about 27 atomic percent.

Though not wishing to be bound by theory, it is believed that the higher levels of chromium in the primary intergranular phase are required due to the high concentrations of easily corrodable vanadium metal.

Other electrochemical hydrogen storage alloy compositions having enhanced charge retention properties include $$(V_{33}Ti_{17}Zr_{16}N_{34})_{0.93}Cr_{0.07}.$$

which can also be written as $$V_{31}Ti_{16}Zr_{15}Ni_{32}Cr_7.$$

The multiphase polycrystalline structure of the active materials proposed includes a grain phase, which is an intermetallic compound of vanadium, titanium, zirconium, and nickel, with dissolved chromium. The grain phase reversibly stores hydrogen and also has suitable catalytic activity to promote hydrogen oxidation. The composition of this grain phase is about 18: 17: 17: 46: 2 as an atomic ratio of vanadium : titanium : zirconium : nickel : chromium.

Between the grain phases of the polycrystalline structure is a primary intergranular phase which is a solid solution of vanadium, chromium, titanium, and nickel. The composition of this intergranular phase is about 72: 19: 3: 6 as an atomic ratio of vanadium : chromium : titanium : nickel. This intergranular phase is believed to be a hydrogen storage phase, with limited catalytic activity for hydrogen oxidation.

Other useful electrochemical hydrogen storage alloys include $V_{29}Ti_{17}Zr_{16}Ni_{35}Cr_5$, $V_{33}Ti_{13}Zr_{14}Ni_{53}Cr_7$, $V_{25}Ti_{17}Zr_{16}Ni_{40}Cr_2$, $V_{23}Ti_{17}Zr_{15}Ni_{40}Cr_4$, and $V_{22}Ti_{16}Zr_{16}Ni_{39}Cr_7$.

One or more metals of the group Cu, Fe, Mn, or Co may partially substitute for the Ni. One or more metals of the group Mg, Co, La, Nb, Si, and Hf may partially substitute for the Ti and/or Zr.

Figure 1:
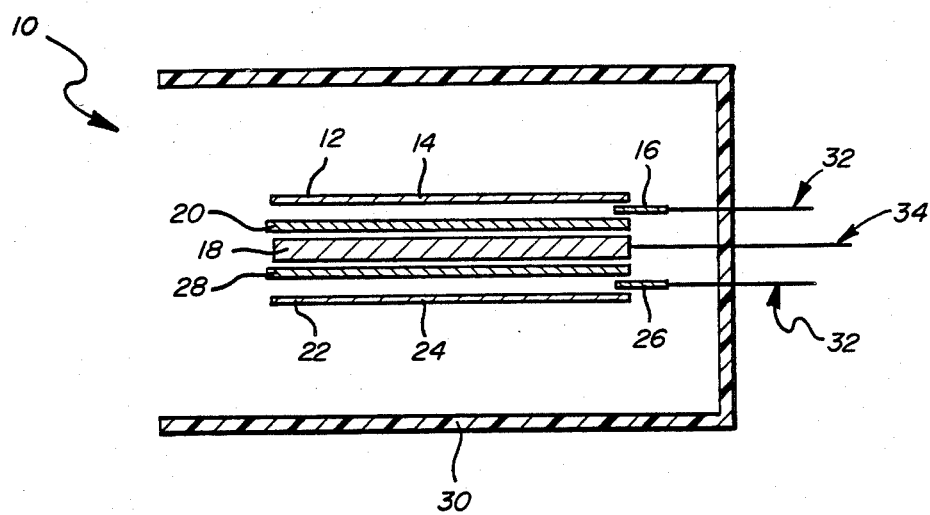
FIG. 1 is a sectional side view of a flat electrochemical cell having a negative electrode in accordance with the invention.
Figure 2:
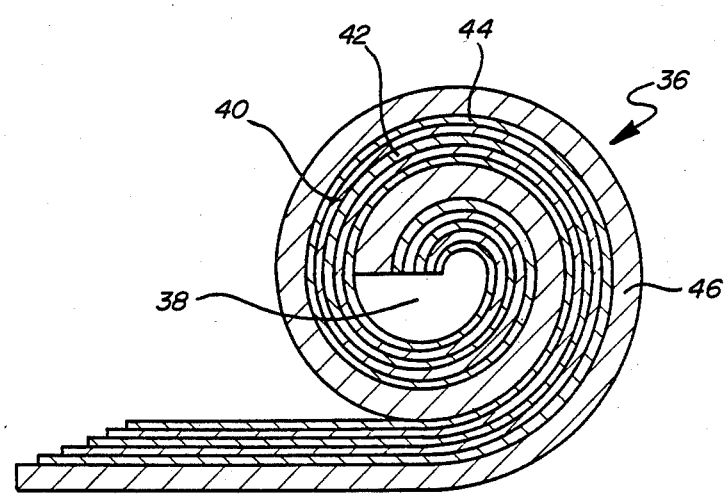
FIG. 2 is a sectional side view of a jelly-roll electrochemical cell having a negative electrode in accordance with the invention.

The charge retention methods and enhanced charge retention negative electrodes in accordance with the invention can be used in many types of cells having a metal hydride, hydrogen storage negative electrode and batteries. Referring now to FIGS. 1 and 2, various electrochemical cell embodiments utilizing the negative electrode of the invention are set forth. In FIG. 1, a flat cell 10 is illustrated that includes a substantially flat plate negative electrode 12 in accordance with the invention. Electrode 12 includes a current collector 14 that is in electrical contact with the active material of electrode 12 and a tab 16. Collector 14 and tab 16 may be made of suitably conductive metals such as nickel. Flat cell 10 includes a positive electrode or counter electrode 18 which is substantially flat and aligned to be in operative contact with negative electrode 12. A separator 20 is disposed between counter electrode 18 and negative electrode 12.

A second negative electrode 22 may be spaced in operative contact with the counter electrode 18 on the side of counter electrode 18 opposite negative electrode 12. Negative electrode 22 is similar to electrode 12 and includes a current collector 24 which is in electrical contact with the active material of electrode 22 and tab 26. A second separator 28 is disposed between negative electrode 22 and the counter electrode 18.

Cell 10 depicted in FIG. 1 may be sealed in a suitable material, such as a plastic container 30, which does not deteriorate in contact with the electrolyte used and allows venting of cell 10 should it gas beyond a predetermined limit during operation. A 30 weight percent aqueous solution of potassium hydroxide is a preferred electrolyte. First and second tabs 16 and 35, 26 are electrically connected to a first set of leads 32 that extends outside of the cell plastic 30. Likewise, a second lead 34 electrically connects to counter electrode 18 and extends outside of plastic container 30.

FIG. 2 illustrates a commercially preferred jelly-roll cell 36 that is made by spirally winding a flat cell about an axis 38. Jelly-roll cell 36 includes an electrical contact tab 40, a negative electrode 42, separator 44 and a positive electrode 46. Jelly-roll cell 36 may be placed in a can or other suitable container (not shown) that contacts tab 40 connected to negative electrode 42. Separator 44 is positioned between the negative electrode 42 and the positive electrode 46.

The present invention further contemplates a number of methods for preparing the above described active materials. Suitable methods reproducibly prepare the materials with both composition and structure that is homogeneous. It was found that appropriate amounts of the individual components of the material could be starting reactants in a melting process to form a bulk composition or ingot. Although not limited to a melting process to form the material, the invention contemplates conventional techniques such as arc-melting and preferably induction melting for their preparation.

Once the materials are formed in bulk, it becomes necessary to reduce the material to a more appropriate size. Conventional sizing techniques like those previously mentioned are not commercially practical.

However, through a hydriding process disclosed in U.S. Pat. No. 4,551,400, the materials could be embrittled, making pulverization much easier and more economical. The hydriding process includes the steps of hydriding the active material in bulk forms and dehydriding the active material either before or after pulverizing the material to the appropriate size. The hydriding step changes the physical form of the material from a hard, tough ingot into a flaky, ash-like consistency. This ash-like material is readily pulverized.

The hydriding step includes contacting the bulk material with hydrogen gas under the appropriate temperature, pressure, and time conditions to form the hydride of the material. More specifically, an ingot of the material may be placed in a reaction vessel. The vessel is subsequently sealed and evacuated. Generally, a pressure of about $10^{-3}$ torr is suitable. The vessel is then pressurized with hydrogen gas between about 100 to 2000 psi. Generally, maintaining a partial pressure of hydrogen above about 200 psi for a few minutes is sufficient to form the hydride at room temperature. These conditions depend on the composition of the material and its geometry. Materials that have a slower diffusion rate or low interstitial mobility for hydrogen will require more time for suitable embrittlement. The factors that effect the mobility of hydrogen through the phase regions and of the material's structure will determine the pressure, time, and temperature necessary to form a hydride of the material and effectuate suitable embrittlement.

The vessel may be cooled during the hydriding step to prevent any temperature increase. The temperature inside the vessel rises as the material is exposed to the hydrogen due to the exothermic nature of the hydride formation reaction (approximately 10 Kcal./mole for these materials). Without any cooling, the temperature inside the vessel usually elevates to about 250° C. A temperature increase delays the formation of the hydride. The hydriding reaction spontaneously starts upon exposure to hydrogen gas. If a barrier of a passivation layer forms on the surface of the material which prevents contact with the hydrogen gas, the layer should be removed. For example, if an oxide layer forms on the material, the hydrogen initially will only slowly penetrate the oxide layer. Initial heating of the material accelerates the hydriding step. Once a portion of the material's surface is cleaned of the layer, the hydriding reaction proceeds rapidly without further assistance.

Hydride formation of a material batch can be modelled by the ideal gas law. Sufficient embrittlement for easy size reduction of some materials doesn not require complete hydride formation. For example, with a material such as (VTiZrNi)Cr which absorbs about 1.5 weight percent hydrogen, it was found that hydriding to at least about 1.0 weight percent hydrogen provides sufficient embrittlement. Using the ideal gas law and the amount of hydrogen absorbed for sufficient embrittlement, the reaction vessel necessary to embrittle a given batch of material can be readily calculated.

Another step of the novel process is the dehydriding of the material. Dehydriding the material takes place after the material has been sufficiently embrittled by hydride formation. The hydride is returned to the metallic form of the material.

Specifically, dehydriding includes evacuating the vessel with the hydride still inside the reaction vessel and with heating for a sufficient time period to induce release of the incorporated hydrogen. The material should be kept at a temperature sufficiently low to avoid changing the structure of the material. A temperature below 600° C. is usually suitable. The dehydriding step is more quickly completed as the temperature increases. Thus, a temperature of about 400° C. is preferred. As the hydrogen is removed from the vessel it may be compressed and recycled since it is largely uncontaminated.

After the hydrogen is removed, the material is cooled to room temperature in an inert environment like argon. The resultant material has the ash-like features of the hydride and is relatively inert to atmospheric reaction.

Pulverization of the embrittled material may be accomplished by any conventional device such as mechanical attritors, jaw crushers, air-hammer, hardened steel mortar and pestle, or ball-milling. Ball-milling the material gives a particle size distribution especially useful for the fabrication of hydrogen storage electrodes. The particle size of the material may be varied depending upon the application. The flakes resulting from the embrittlement process are usually less than one mm in diameter. Care must be taken during the pulverization process not to expose the pulverized material to any conditions which may allow water or oxygen to contact or react with the pulverized alloy. Using other pulverization techniques will produce different distributions of particle sizes, as well as different particle shapes.

It is important, although not critical, that the pulverizing step follow the dehydriding step. Several significant advantages are demonstrated if the preferred sequence of steps is followed. First, the hydrided form of the material is very reactive with certain gases like oxygen which would deleteriously offset the electrochemical properties of the material. Pulverizing the material after dehydriding reduces the likelihood of contamination. This is not critical because the material could be pulverized in the hydride form without contamination if care were taken to provide an inert environment. The complexity of the procedure, however, makes it less likely to be economically feasible. Second, a single vessel may be used to hydride and dehydride the material without transporting the material between steps. Thus, contamination and costly handling are avoided.

The present invention further contemplates the fabrication of a hydrogen storage electrode from an active material of the composition or structure previously discussed. The active material may be sized to an appropriate particle distribution for preparing the electrodes. Although the material may be of any convenient particle size, we have found that the preferred compositions described above demonstrate the best electrochemical performance when the material has been sized to approximately 75 microns or less than about 200 mesh.

The fabrication of the electrodes using the above described active material may be carried out by several conventional processes. The material may then be pressed to a pressure of about 7 to 10 tons/cm$^2$ by the method described in commonly assigned, copending U.S. application Ser. No. 861,889, now U.S. Pat. No. 4,670,214 filed May 12, 1986 in the names of Douglas Magnuson, Merle Wolff, Sam Lev, Kenneth Jeffries, and Scott Mapes for *Method and Apparatus for Making Electrode Material From High Hardness Active Materials*, incorporated herein by reference. The method includes feeding the metal hydride hydrogen storage alloy powder onto a carrier web, aligning a mesh or screen substrate with the carrier web, and compacting the powder and mesh in a series of roller mills to form a green electrode web. The carrier web is removed after it has passed through the first roller mill, and the remaining green electrode web is passed through the second roller mill and into a sintering furnace. After sintering and cooling, the electrode web is calendared, and then is wound on a take-up reel. The furnace provides a substantially water and oxygen-free argon-hydrogen atmosphere for sintering which discourages electrode web oxidization at the elevated sintering temperature. Alternatively, various conventional methods for effectuating the pressure are contemplated by the present invention.

These materials are sintered in the range of 800° to 1200° C. for a period of several minutes to an hour. Preferably, a temperature of about 950° C. is used for about five minutes. As the temperature of the sintering process decreases the length for sintering increases, it is economically preferred to have a higher sintering temperature for a shorter period of time.

Prior to being rolled into electrochemical cells, the negative electrodes may also be treated according to the methods described in our commonly assigned U.S. application, Ser. No. 947,148, filed Dec. 29, 1986, in the names of Benjamin Reichman, Srini Venkatesan, Michael A. Fetcenko, Kenneth Jeffries, Sharon Stahl, and Clifford Bennett for *Activated Rechargeable Hydrogen Storage Electrode and Method*, incorporated herein by reference.

For example, prior to being assembled into cells, the electrodes may be etched by placing the electrode in a solution of 30% potassium hydroxide in water, and held at a temperature of 50° C. for a period of 1 hour. The electrode may then be preformed, which involves giving the electrode one or more electrochemical cycles prior to cell assembly. While not mandatory, electrodes treated according to this process show fast activation, high discharge rate capability, and low pressure.

While the invention has been described primarily with respect to vanadium corrosion and chromium as a modifier, it is to be understood that a broader invention is contemplated. For example, it is also the case that other materials than chromium could be used to accomplish the objective of the invention. Any material or combination of materials which has suitable physical and chemical passivation properties in the alkaline medium discussed have beneficial effect. For example, Molybdenum and/or Tungsten could be fully or partially substituted for chromium in the V-Ti-Zr-Ni family of materials.

In addition, it is also contemplated that materials like Mn, Fe, Co, Cu could be partially substituted for nickel. These materials have different oxidation properties than nickel in an alkaline environment. However, a suitable combination of these additives, with or without another passivation agent, such as Cr, Mo, W, beneficially affects the corrosion properties of host elements in a metal hydride negative electrode.

Finally, while the oxidation properties of titanium dioxide and zirconium dioxide do not have acceptable abilities to inhibit the corrosion of vanadium, other materials may be partially substituted for titanium and zirconium to thereby provide more suitable passivation properties. These include elements such as Mg, Ca, La, Nb, Si, and Hf.

The following examples are illustrative of the method of the invention.

EXAMPLE 1

Comparative Self Discharge

Twenty-nine electrochemical cells were made and tested for self discharge. All cells were identical except for the composition of the active material used in the metal hydride negative electrode. All cells were fabricated in a sealed, cylindrical $C_s$ size jelly-roll configuration, with identical electrolyte levels of 30% potassium hydroxide in water. The counter electrode for each cell was a sintered nickel hydroxide positive electrode produced from uniform fabrication conditions.

All cells were given several electrochemical cycles to achieve a steady state capacity. This involved charging the cells at a rate of 200mA for a period of 15 hours, followed by discharge at 300mA to a cutout voltage of 1.0 volt per cell.

Once steady state capacity was attained, the cells were charged at 200mA for 15 hours, taken off charge, and placed on open circuit for 7 days (168 hours) at a temperature of about 20° C. After this time period, the cells were tested for self discharge by being discharges at a rate of 300mA to a 1.0 volt cutout. Self-discharge was calculated in percent loss by comparing the measured capacity after 7 days on open circuit to the original steady state capacity without an open circuit stand.

Several cells of a few types of active material compositions according to inventions were made and compared to cells made without invention.

| Composition | Number of Cells | Average Self-Discharge after 7 days at 20° C. |
|---|---|---|
| $V_{25}Ti_{17}Zr_{16}Ni_{42}$ | 4 | 38% loss |
| $V_{33}Ti_{13}Zr_{14}Ni_{33}Cr_7$ | 5 | 27% loss |
| $V_{27}Ti_{17}Zr_{16}Ni_{35}Cr_5$ | 5 | 25% loss |
| $V_{25}Ti_{17}Zr_{16}Ni_{40}Cr_2$ | 7 | 29% loss |
| $V_{23}Ti_{17}Zr_{16}Ni_{40}Cr_4$ | 5 | 33% loss |
| $V_{22}Ti_{16}Zr_{16}Ni_{39}Cr_7$ | 3 | 32% loss |

EXAMPLE 2

Comparative Self Discharge

To establish consistency, additional cells of three material types were prepared as described in Example 1 and measured for self discharge as compared to standard cells.

| Composition | Number of Cells | Average Self-Discharge after 7 days at 20° C. |
|---|---|---|
| $V_{25}Ti_{17}Zr_{16}Ni_{42}$ | * | 30% loss |
| $V_{33}Ti_{13}Zr_{14}Ni_{33}Cr_7$ | 8 | 20% loss |
| $V_{27}Ti_{17}Zr_{16}Ni_{35}Cr_5$ | 9 | 19% loss |
| $V_{22}Ti_{16}Zr_{16}Ni_{39}Cr_7$ | 4 | 17% loss |

*Average self discharge for several hundred cells prepared from this material composition.

EXAMPLE 3

Comparative Aging Effect

Aging is the degradation of charge retention for a given cell which occurs after testing. In other words, the self discharge of a freshly fabricated cell is better than that of a cell which has undergone high rate testing and which has undergone cycle life testing.

The cells specified in Example 1, with established initial self discharge rates, underwent routine capacity versus rate evaluation up to 4.8 Ampere discharge rate. The cells were then charged at 200 mA for 15 hours, and placed on open circuit for 7 days (168 hours) at a temperature of 20° C. The cells were then discharged at a rate of 300 mA to a cutout voltage of 1.0 V. Self discharge was calculated by comparing available capacity after 7 days to the original baseline capacity.

Aging was determined by comparing the original self discharge rate to the self discharge rate measured after high rate testing. Results were shown in the Table.

| Composition | Number of Cells | 7 Day Self Discharge (20° C.) | | |
|---|---|---|---|---|
| | | Original | After Testing | Change |
| $V_{25}Ti_{17}Zr_{16}Ni_{42}$ | 4 | 38% loss | 55% loss | 17% |
| $V_{33}Ti_{13}Zr_{14}Ni_{33}Cr_7$ | 5 | 27% loss | 42% loss | 15% |
| $V_{27}Ti_{17}Zr_{16}Ni_{35}Cr_5$ | 5 | 25% loss | 38% loss | 13% |
| $V_{25}Ti_{17}Zr_{16}Ni_{40}Cr_2$ | 7 | 29% loss | 47% loss | 18% |
| $V_{23}Ti_{17}Zr_{16}Ni_{40}Cr_4$ | 5 | 33% loss | 43% loss | 20% |
| $V_{22}Ti_{16}Zr_{16}Ni_{39}Cr_7$ | 3 | 18% loss | 22% loss | 4% |

EXAMPLE 4

Comparative Aging Effect

The cells described in Example 2 underwent high rate testing and self discharge rates were measured before and after testing and compared to cells prepared with materials not prepared according to invention.

High rate testing involves discharging the $C_s$ cells at rates on the order of 4.8 Amps. It is believed that many of the processes which cause aging after extended electrochemical cycling can be accelerated by high rate testing.

| Composition | Number of Cells | 7 Day Self-Discharge (20° C.) | | |
|---|---|---|---|---|
| | | Original | After Test | Change |
| $V_{33}Ti_{13}Zr_{14}Ni_{33}Cr_7$ | 8 | 20% | 22% | 2% |
| $V_{27}Ti_{17}Zr_{16}Ni_{35}Cr_5$ | 9 | 19% | 19% | 0% |
| $V_{22}Ti_{16}Zr_{16}Ni_{39}Cr_7$ | 4 | 17% | 17% | 0% |

EXAMPLE 5

The cells described in Examples 2 and 4 also underwent life cycle testing. Standard cells without the invention showed degraded charge retention after cycling, referred to as aging.

The cells of Example 2 were given 50 electrochemical charge/discharge cycles by charging at a rate of 1 Amp to a thermal cutout overcharge, followed by discharge at 2 Amps to a cutout voltage of 1.0 volt. After 50 cycles, the cells were charged at 200 mA for 15 hours and discharged at 300 mA to a 1.0 volt cutout to reestablish baseline capacity. The cells were then charged at 200 mA for 15 hours and placed on open circuit for 7 days (168 hours) at 20° C. The cells were then discharged at 300 mA to 1.0 volt. Self discharge was measured as the retained capacity after 7 days compared to the reestablished baseline capacity.

Aging was determined by comparing the original self discharge rate to the self discharge rate measured after the testing of Example 4 and 50 electrochemical cycles.

| Composition | Number of Cells | 7 Day Self Discharge | |
|---|---|---|---|
| | | Original | After Test |
| $V_{33}Ti_{13}Zr_{14}Ni_{33}Cr_7$ | 6 | 20% | 21% |
| $V_{27}Ti_{17}Zr_{16}Ni_{35}Cr_5$ | 5 | 18% | 17% |
| $V_{22}Ti_{16}Zr_{16}Ni_{39}Cr_7$ | 2 | 16% | 20% |

Standard cells made without the invention could be expected to degrade from 30% loss originally to over 60% loss under the conditions specified in this Example.

EXAMPLE 6

Aging Due to Cycling

Two cells made of inventive negative electrode material compositions were compared to 8 standard cells in degradation of self discharge due to cycling.

The initial self discharge rate for all cells was measured after a few workup cycles to establish a steady state baseline capacity. This was done by charging the $C_s$ size sealed cylindrical cells at a rate of 300 mA for 9 hours, followed by discharge at 300 mA to a cutout voltage of 1 volt. Once a baseline capacity was established, self discharge tests were done. This involved charging the cell at a rate of 300 mA for 9 hours, and placing the cells on open circuit at a temperature of about 20° C. for a period of 7 days (168 hours). The cells were then discharged at 300 mA to a 1.0 volt cutout and self discharge was measured by comparing the retained capacity after 7 day open circuit to the original baseline capacity.

Aging effect, or degradation of self discharge due to cycling, was measured by placing about 60 electrochemical charge/discharge cycles on the standard cells, and by placing 72 electrochemical charge/discharge cycles on the cells made with negative electrodes of invention composition. Self discharge was again measured after cycling and the results were as follows:

| Composition | Number of Cells | Number of Cycles | Self Discharge (7 days 20° C.) Initial | After Cycling |
|---|---|---|---|---|
| $V_{25}Ti_{17}Zr_{16}Ni_{42}$ | 8 | 60 | 38% | 76% |
| $V_{33}Ti_{13}Zr_{14}Ni_{33}Cr_7$ | 1 | 72 | 19% | 20% |
| $V_{27}Ti_{17}Zr_{16}Ni_{35}Cr_5$ | 1 | 72 | 21% | 21% |

EXAMPLE 7

Vanadium Corrosion

The degree that vanadium corrosion can be inhibited by the modification of standard materials with chromium was measured. Two electrode samples were tested. The first electrode had a material composition of $V_{25}Ti_{17}Zr_{16}Ni_{42}$ and the second had a composition of $V_{33}Ti_{13}Zr_{14}Ni_{33}Cr_7$.

An electrode of each type was measured for vanadium corrosion. Segments of each, containing about 1.5 grams of active material were placed in a container with 100 ml of electrolyte of composition 30% potassium hydroxide in water, measured in weight percent. The electrolyte was at a temperature of about 25° C.

Corrosion rate was measured by extracting 10 ml samples of the electrolyte after discrete periods of time for analysis. The 10 ml samples were analyzed for vanadium using an atomic absorption spectrophotometer, model 2380 manufactured by Perkin-Elmer. The values presented in the table for the two electrodes were compared to calibration standards of known vanadium concentration using a vanadium lamp and a nitrous oxide-/acetylene flame.

| Time | $V_{33}Ti_{13}Zr_{14}Ni_{33}Cr_7$ Parts per million Vanadium | $V_{25}Ti_{17}Zr_{16}Ni_{42}$ Parts per million Vanadium |
|---|---|---|
| 4 Hours | 5 ppm | 7 ppm |
| 1 day | 11 ppm | 21 ppm |
| 3 days | 12 ppm | 61 ppm |
| 7 days | 12 ppm | 170 ppm |

EXAMPLE 8

Failure Analysis - Vanadium Corrosion

Three cells were electrochemically tested for self discharge. Two of these cells were prepared with negative electrodes having active materials not using the invention while the third cell had a negative electrode made with active material of the preferred inventive composition.

These cells were all fabricated under the same conditions except for the negative material composition; namely sealed, cylindrical jelly-roll cells of $C_s$ size. They all underwent about 30 electrochemical cycles, which included some cycles of high rate discharge. The self discharge rate for each cell was measured as follows:

| Cell | Composition (7 days at 20°) | Self Discharge |
|---|---|---|
| A | $V_{25}Ti_{17}Zr_{16}Ni_{42}$ | 55%* |
| B | $V_{25}Ti_{17}Zr_{16}Ni_{42}$ | 65%* |

-continued

| Cell | Composition (7 days at 20°) | Self Discharge |
|---|---|---|
| C | $V_{22}Ti_{16}Zr_{16}Ni_{39}Cr_7$ | 14% |

*extrapolated from 3 day loss self discharge rate results.

Each of these cells then underwent detailed analysis for vanadium corrosion. The cells were carefully dismantled under a protective atmosphere. Samples of the negative electrode, positive electrode, and the separator were used to measure the level of vanadium present in the electrolyte.

The electrolyte from each segment was removed by Soxhlet extraction. The fraction of electrolyte in the sample was precisely determined in relation to the entire electrode. Thus, the electrolyte sample used for vanadium analysis was taken from all places within the cell and was considered representative.

The electrolyte samples were analyzed for dissolved vanadium in solution using an atomic absorption spectrophotometer. The original electrolyte samples were carefully diluted after the Soxhlet extraction process. Approximately 5 ml of the diluted sample was analyzed using a Perkin Elmer Model 2380 spectrophotometer. The values obtained were compared to calibration standards of known vanadium concentration using a vanadium lamp and a nitrous oxide/acetylene flame.

After analysis, the values for vanadium concentration were calculated for the actual cells, compensating for sample size and dilution factors. The cell utilizing a negative electrode with material of inventive composition showed substantially reduced levels of vanadium corrosion versus cells made without the inventive compositions.

| Cell | Composition | Self Discharge (7 days at 20° C.) | Vanadium Concentration (Parts per Million) |
|---|---|---|---|
| A | $V_{25}Ti_{17}Zr_{16}Ni_{42}$ | 55% | 6233 |
| B | $V_{25}Ti_{17}Zr_{16}Ni_{42}$ | 65% | 2369 |
| C | $V_{22}Ti_{16}Zr_{16}Ni_{39}Cr_7$ | 14% | 73 |

EXAMPLE 9

Two commercially available nickel-cadmium cells were tested for the influence of vanadium on self discharge. Two $C_s$ size, sealed, cylindrical nickel-cadmium cells manufactured by Sanyo were removed from the metal container, but were retained in the tightly wound jelly-roll configuration. The cells were placed in a container which held about 50 ml of 30% potassium hydroxide in water electrolyte, measured in weight percent.

The cells were electrochemically cycled in this configuration by charging at a rate of 300 mA for 10 hours followed by discharge at 300 mA to a cutout voltage of 1.0 volt. After a few cycles to establish a cell baseline capacity, the cells were measured for self discharge by charging at 300 mA for 10 hours, and placing the cell on open circuit for a period of 24 hours at a temperature of about 25° C. The cells were discharged at 300 mA to a 1.0 volt cutout, and self discharge was measured as the difference in retained capacity after 24 hour open circuit period and the original baseline capacity.

. At this point, the electrolyte was changed to deliberately provide vanadium corrosion products to the cell and measure the effect on self discharge.

The electrolyte had been modified with added vanadium separately. In a separate container, an electrode of material composition $V_{25}Ti_{17}Zr_{16}Ni_{42}$ had been held at a potential of −0.3 V versus a Hg/HgO/OH⁻ reference electrode for 24 hours to intentionally promote vanadium corrosion. Previous experiments had indicated the vanadium concentration under these conditions at about 4000 ppm.

The nickel-cadmium cells were removed from the pure KOH electrolyte and placed in the vanadium containing KOH electrolyte. The cells were electrochemically cycled in the same manner as previous. Once a new baseline capacity was achieved, the cells were measured for self discharge in the same manner as previous, and the results are presented as follows:

| Nickel-Cadmium Cell | Initial Capacity | Initial 24 Hour Self-Discharge | Final Capacity | Final 24 Hour Self-Discharge |
|---|---|---|---|---|
| A | 1.42 Ahr | 2.8% | 1.94 Ahr | 20.1% |
| B | 1.56 Ahr | 10.9% | 1.71 Ahr | 18.1% |

Initial - pure KOH electrolyte
Final - vanadium containing KOH electrolyte

EXAMPLE 10

Nitrates

Four positive electrodes were analyzed to determine the levels of residual nitrates remaining from fabrication. The positive electrodes were prepared inhouse using the chemical conversion process which is in widespread use throughout the battery industry. The only known difference between positive electrodes used throughout industry and those prepared inhouse concerned the loading of nickel hydroxide. Whereas conventional nickel-cadmium cells have positives loaded to about 1.5 grams of nickel hydroxide per cubic centimeter of void volume within the support matrix; positive electrodes prepared inhouse for use in tandem with metal hydride negative electrodes have a higher loading at about 2.1 grams of nickel hydroxide per cubic centimeter void volume within the support matrix.

These electrodes were analyzed for residual nitrates by first utilizing the conventional Soxhlet extraction process. In effect, Soxhlet extraction is felt to be a more effective form of rinsing than easily attainable in practice. Thus, the electrodes were rinsed by the Soxhlet extraction process for a period of 24 hours, and the extraction solvent was analyzed for nitrate ion concentration.

The solvent used in Soxhlet extraction was distilled water. After extraction, the solvent was diluted to 85 ml, with 15 ml of a 2.0 M ammonium sulfate solution was added as a buffer.

Nitrate concentrations were measured on a Fisher Accument pH meter (model 825MP), using a nitrate ion specific electrode manufactured by Corning (model 476134). A double junction (Ag/AgCl) reference electrode was also used, manufactured by Corning (model 476067). The measured values for nitrate concentration were compared to calibration standards of known nitrate concentrations.

The values presented in the table for nitrate concentration present the extrapolated nitrate concentration for a $C_s$ cell utilizing this positive electrode. The value assumes that all of the residual nitrate ions presented in the positive electrode will ultimately migrate into the potassium hydroxide electrolyte used in these types of cells.

| Electrode | Nitrate Concentration in a $C_s$ Cell |
|---|---|
| A | 704 ppm |
| B | 632 ppm |
| C | 640 ppm |
| D | 564 ppm |

As a reference, it is generally accepted in the nickel-cadmium industry that nitrate levels above 200 ppm can adversely affect the charge retention of nickel-cadmium cells.

EXAMPLE 11

Surface Area

The invention is shown to affect the surface area of the negative electrode compared to electrodes of standard material composition.

The cells which had been electrochemically cycled and tested for self discharge were analyzed. One cell had a negative material composition of $V_{25}Ti_{17}Zr_{16}Ni_{42}$ and was measured to have a high self discharge rate of about 65% capacity loss in 7 days of open circuit. The other cell had a negative material composition according to the invention of $V_{22}Ti_{16}Zr_{16}Ni_{39}Cr_7$ and was measured to have a low self discharge rate of about 14% capacity loss in 7 days of open circuit.

Both cells were dismantled and analyzed for negative electrode surface area. This involved dismantling the cell in an Argon atmosphere. The negative electrodes then underwent Soxhlet extraction to remove the potassium hydroxide electrolyte. The electrodes were then dried at about 60° C. for a period of about 24 hours under an Argon environment. About 1 to 2 grams from each dried electrode was used for surface area measurement.

Surface area was determined by the well known gas absorption surface area measurement (BET) technique. The electrode segments were placed in a bulk sample cell and outgassed under a nitrogen purge at a temperature of 250° to 300° C. The sample cell was then immersed in liquid nitrogen under an atmosphere of 0.3 mole fraction nitrogen in balance Helium. The amount of nitrogen absorbed is proportional to the sample surface area and is measured using a Model Q5-9 quantasorb surface area analyzer, manufactured by Quantachrome.

BET surface areas presented in the table are expressed as area in square meters per gram of active material and are alternately expressed as roughness factor. The roughness factor is dimensionless, and is the total sample surface area divided by the outside or geometric surface area.

| Composition | 7 day Self Discharge | Roughness Factor | Surface Area (M²/g) |
|---|---|---|---|
| $V_{25}Ti_{17}Zr_{16}Ni_{42}$ | 65% | 10700 | 14.4 |
| $V_{22}Ti_{16}Zr_{16}Ni_{39}Cr_7$ | 14% | 6020 | 8.6 |

EXAMPLE 12
Oxide Condition

This example presents how the surface condition of the negative electrode can be correlated to electrochemical self discharge performance.

Three cells were analyzed for negative electrode surface condition. One cell had a negative electrode of composition $V_{25}Ti_{17}Zr_{16}Ni_{42}$ which was measured to have an abnormally low self discharge rate of about 18% capacity loss in 7 days. The cell was analyzed for surface compositions prior to the expected degradation in self discharge from cycling. The second analyzed cell also had a negative electrode of composition $V_{25}Ti_{17}Zr_{16}Ni_{42}$ which was measured to have a self discharge rate of about 55% capacity loss in 7 days, after undergoing high rate and cycle life testing. The third cell had a negative electrode of the inventive material composition $V_{22}Ti_{16}Zr_{16}Ni_{39}Cr_7$, and was measured to have a self discharge rate of about 14% loss in 7 days. Similar cells to this type had also shown negligible degradation in self discharge as a function of high rate and cycle life testing.

Electrode samples for surface analysis were obtained by dismantling the cells in an Argon glove box. The negative electrodes were rinsed in distilled water to remove residual potassium hydroxide and dried at 60° C. for a period of about 24 hours to remove water contained within the electrode. A segment measuring approximately 1 square centimeter was then removed for oxide analysis.

Without atmospheric exposure, the electrode specimen was transferred through an introduction chamber/interlock system to the analytical chamber of a Perkin Elmer Model 550 ESCA/SAM analytical system which has a background pressure of about $1.0 \times 10^{-6}$ Torr. The surface was then analyzed for composition and thickness using Auger Electron Spectroscopy (AES), and for chemical bonding information using Electron Spectroscopy for Chemical Analysis (ESCA).

In AES, the chemical survey occurred over a 10 micron diameter spot using a 3 KV electron beam. Analysis was done in the derivative mode using a lock-in amplifier with a peak-to-peak modulation of about 3 volts. Depth profiling to determine oxide thickness was done in parallel, using 4 KV argon ions with a raster size of 2 mm $\times$ 2 mm.

In ESCA, chemical analysis was obtained using aluminum K-alpha x-rays. Resultant photoelectrons were analyzed in the retarding mode with a pass energy of about 15 to 25 eV. Incident x-rays covered a specimen area of about 1 square centimeter while the analyzed area is about 0.5 square centimeters.

FIGS. 3, 4, and 5 represent AES depth profiles for the surfaces of the three analyzed negative electrodes. The ordinate is concentration, measured in atomic percent. The abcissa is labeled in sputter time. For all three profiles, the sputter rate was 41.6 angstroms per minute with respect to a tantalum oxide calibration standard. Thus, the sputter time is also a scale of oxide thickness.

FIG. 3 represents the surface of the negative electrode of composition $V_{25}Ti_{17}Zr_{16}Ni_{42}$ which exhibited a high self discharge rate (about 55% capacity loss in 7 days). The maximum oxygen concentration at the outer surface is about 32 atomic percent, while the nickel concentration at the outer surface is about 19 atomic percent. The nickel concentration climbs sharply, reaching a maximum value of about 40% in 3 minutes, which corresponds to a surface thickness of about 125 angstroms.

FIG. 4 represents the surface of the negative electrode of composition $V_{25}Ti_{17}Zr_{16}Ni_{42}$ which exhibited good charge retention (18% capacity loss in 7 days), and was analyzed before charge retention could degrade. The maximum oxygen concentration is about 39 atomic percent and falls off to a level of about 50% of original in about 8 minutes, for an oxide thickness of about 330 angstroms. The initial nickel concentration at the outer surface is about 5 atomic percent, and gradually rises to a maximum value of about 38% in 13 minutes, which corresponds to a thickness of about 540 Angstroms.

Comparing these two figures shows a thicker surface oxide for the cell having low self discharge than the cell having high self discharge. Additionally, it can be observed that the surface of the cell having high self discharge has a high concentration of nickel, which has been found to be in its metallic state from previous ESCA surveys of such surfaces.

FIG. 5 represents the surface of the negative electrode of invention composition $V_{22}Ti_{16}Zr_{16}Ni_{39}Cr_7$ which exhibited good charge retention (14% capacity loss in 7 days). The maximum oxygen concentration at the surface is 50 atomic percent, which falls off to a level 50% of original in 9 minutes, which corresponds to an oxide thickness of about 370 Angstroms. The nickel concentration at the outer surface is about 7 atomic percent and rises gradually to reach a value of about 37 atomic percent after 9 minutes, which corresponds to a surface thickness of about 370 Angstroms.

The similarities between this surface (FIG. 5) and that for the cell having low self discharge (FIG. 4) are easily observed versus that of the cell having high self discharge (FIG. 3). For both cells having low self discharge, the nickel concentration rises much more gradually than the cell having high self discharge. The outer surfaces for the cells having low self discharge rates seem to have a greater degree of oxides, which are expected to have a greater insulative quality than nickel, which is found in the metallic form, having greater conductivity.

Significantly, it can be expected that the surface of the inventive composition will retain this structure, while the surface of the cell having standard composition with low self discharge can be expected to degrade to the type of surface analyzed with high self discharge.

Previous ESCA surveys of such surfaces, as disclosed in OBC-24, have shown that elements titanium, zirconium, and chromium are found in oxide form ($TiO_2$, $ZrO_2$, $Cr_2O_3$) while nickel has been analyzed to be in its free metal state.

While the invention has been described with respect to certain preferred exemplification and embodiment, it is not intended to limit the scope of the claims thereby, but solely by the claims appended hereto.

We claim:

1. A reversible, multicomponent, multiphase, electrochemical hydrogen storage alloy capable of electrochemically changing and discharging hydrdogen in an alkaline media, said hydrogen storage alloy having the composition $(Ti_{2-x}Zr_xV_{4-y}Ni_y)_zCr_{1-z}$ where $0.0 < x < 1.5$, $0.6 < y < 3.5$, and z is an effective amount less then 0.20, and comprising multicomponent hydrogen storage phases capable of reversibly storing hydrogen, where at least one of the components in the said multicomponent hydrogen storage phase is soluble in the alkaline media, and wherein the said multicomponent, multiphase hydrogen storage alloy further includes chromium as a modifier to inhibit the corrosion of the soluble component into the strongly ionic aqueous media.

2. The reversible, multicomponent, multiphase, electrochemical hydrogen storage alloy of claim 1 wherein the soluble compoent is Vanadium.

3. A reversible, multicomponent, multiphase, electrochemical hydrogen storage alloy comprising titanium, vanadium, zirconium, nickel, and chromium, having the composition $(Ti_{2-x}Zr_xV_{4-y}Ni_y)_{1-2}Cr_z$ where $0.0<x<1.5$, $0.6<y<3.5$, and z is an effective amount less then 0.20; said hydrogen storage alloy being capable of electrochemically charging and discharging hydrogen in alkaline aqueous media, the vanadium in said multicomponent hydrogen storage phase normally being soluble in the alakline, aqueous media, and the chromium acting to inhibit the solubilization of the vanadium into the aqueous alkaline aqueous media.

4. The reversible, multicomponent, multiphase hydrogen storage alloy of claim 3 having the composition $V_{33}Ti_{13}Zr_{14}Ni_{33}Cr_7$.

5. The reversible, multicomponent, multiphase hydrogen storage alloy of claim 3 having the composition $V_{27}Ti_{17}Zr_{16}Ni_{35}Cr_5$.

6. The reversible, multicomponent, multiphase hydrogen storage alloy of claim 3 having the composition $V_{25}Ti_{17}Zr_{16}Ni_{40}Cr_2$.

7. The reversible, multicomponent, multiphase hydrogen storage alloy of claim 3 having the composition $V_{23}Ti_{17}Zr_{16}Ni_{40}Cr_4$.

8. The reversible, multicomponent multiphase hydrogen storage alloy of claim 3 having the composition $V_{22}Ti_{16}Zr_{16}Ni_{39}Cr_7$.

9. The reversible, multicomponent, multiphase hydrogen storage alloy of claim 3 further comprising a second modifier chosen from the group consisting of at least one of copper, iron, manganese and cobalt.

10. The reversible, multicomponent, multiphase hydrogen storage alloy of claim 3 further comprising a hydrogen storage component chosen from the group consisting of at least one of magnesium, calcium, lanthanum, niobium, silicon, and hafnium.

11. A sealed, rechargeable electrochemical cell comprising:
(a) a positive electrode;
(b) a negative electrode comprising a body of modified multiphase, multicompoennt, reversible electrochemical hydrogen storage alloy comprising titanium, vanadium, zirconium, nickel, and chromium, having the composition $(Ti_{2-x}Zr_xV_{4-y}Ni_y)_{1-2}Cr_z$ where $0.0<x<0.5$, $0.6<y<3.5$, and z is a positive number less then 0.20;
(c) a separator means positioned between the positive and negative electrodes;
(d) electrolyte means in contact with the separator means and the positive and negative electrodes; and
(e) sealed container means containing the positive and negative electrodes, spacer means, and electrolyte means in operative relationship.

12. The electrochemical cell of claim 11 wherein the positive electrode comprises nickel hydroxide.

13. The electrochemical cell of claim 11 wherein the separator is nonwoven nylon.

14. The electrochemical cell of claim 13 wherein the nonwoven nylon separator has a thickness of about 0.0085 inch.

15. The electrochemical cell of claim 11 wherein the electrolyte is aqueous alkali metal hydroxide.

16. The electrochemical cell of claim 15 wherein the electrolyte comprises potassium hydroxide.

17. The electrochemical cell of claim 16 wherein the electrolyte comprises approximately 30 weight percent potassium hydroxide.

18. The electrochemical cell of claim 16 wherein the electrolyte further comprises lithium hydroxide.

19. The electrochemical cell of claim 18 wherein the electrolyte comprises less than 15 grams per liter of lithium hydroxide.

20. The electrochemical cell of claim 11 wherein the positive electrode comprises nickel hydroxide and the electrolyte comprises nitrate and nitrite ions as an impurity.

21. The electrochemical cell of claim 20 wherein the concentration of the nitrate ion and nitrite ion is greater than about 200 parts per million.

22. The electrochemical cell of claim 21 wherein the concentration of the nitrate ion and nitrite ion is at least about 500 parts per million.

23. The electrochemical cell of claim 11 having an electrolyte volume high enough to permit fast gas recombination in a sealed cell.

24. The electrochemical cell of claim 11 having excess electrolyte volume for vented operation.

25. The electrochemical cell of claim 11 having a wound configuration.

26. The electrochemical cell of claim 11 wherein said negative electrode comprises a modified, multiphase, multicomponent, reversible electrochemical hydrogen storage alloy comprising titanium, vanadium, zirconium, nickel, and chromium, said hydrogen storage alloy being capable of electrochemically charging and discharging hydrogen in aqueous alkaline media.

27. The electrochemical cell of claim 11 wherein the modified hydrogen storage alloy active material has the composition $V_{33}Ti_{13}Zr_{14}Ni_{33}Cr_7$.

28. The electrochemical cell of claim 11 wherein the modified hydrogen storage alloy active material has the composition $V_{27}Ti_{17}Zr_{16}Ni_{35}Cr_5$.

29. The electrochemical cell of claim 11 wherein the modified hydrogen storage alloy active material has the composition $V_{25}Ti_{17}Zr_{16}Ni_{40}Cr_2$.

30. The electrochemical cell of claim 11 wherein the modified hydrogen storage alloy active material has the composition $V_{23}Ti_{17}Zr_{16}Ni_{40}Cr_4$.

31. The electrochemical cell of claim 11 wherein the modified hydrogen storage alloy active material has the composition $V_{22}Ti_{16}Zr_{16}Ni_{39}Cr_7$.

32. The electrochemical cell of claim 11 wherein the modified hydrogen storage alloy active material further comprises a second modifier chosen from the group consisting of at least one of copper, iron, manganese, and cobalt.

33. The electrochemical cell of claim 11 wherein the modified hydrogen storage alloy active material further comprises a hydrogen storage component chosen from the group consisting of at least one of magnesium, calcium, lanthanum, niobium, silicon, and hafnium.

34. The electrochemical cell of claim 11 wherein the modified, multiphase, multicomponent, reversible electrochemical hydrogen storage alloy comprises hydrogen storage alloy multicomponent phases capable of reversibly storing hydrogen, wherein at least the vanadium is soluble in the electrolyte, and where in the chromium inhibits the loss of the soluble vanadium component into the strongly ionic, aqueous media.

35. The electrochemical cell of claim 34 having a reduced level of vanadium in the electrolyte.

36. The electrochemical cell of claim 35 having a reduced level of vanadium in the electrolyte whereby to substantially reduce the effects of vanadium redox shuttles self discharge mechanism.

37. The electrochemical cell of claim 35 having a reduced level of vanadium in the electrolyte whereby to substantially reduce the effects of vanadium corrosion on the chemical stability of the positive electrode.

38. The electrochemical cell of claim 11 having a reduced rate of self discharge.

39. The electrochemical cell of claim 11 wherein the surface of the negative electrode is substantially resistant to the effects of redox couple reduction mechanisms.

40. The electrochemical cell of claim 39 wherein the redox couple is one or more of:
    (a) $NO_3^- \; NO_2^-$, and
    (b) $V^{+5} \; V^{+4}$.

41. The electrochemical cell of claim 11 wherein the self discharge reaction is one of:
    (a)
    $$O_2 + 2e^- + H_2O$$
    $$HO_2^- + OH^-, \text{ and}$$
    (b) $O_2 + 4e^- + 2H_2O \; 4 \; OH^-$.

42. The electrochemical cell of claim 11 wherein the surface of the negative electrode of modified hydrogen storage alloy active material has less active surface than an unmodified electrode and is less active to self discharge reactions.

43. The electrochemical cell of claim 42 wherein the modifier reduces the active surface area of the negative electrode of modified hydrogen storage alloy active material.

44. The electrochemical cell of claim 11 wherein the surface of the negative electrode of modified hydrogen storage alloy active material has less surface roughness than an unmodified electrode and is less active to self discharge reactions.

45. The electrochemical cell of claim 11 wherein the modified hydrogen storage alloy active material is less susceptible to corrosion in the electrolyte than unmodified hydrogen storage alloy active material, and the surface of the negative electrode of modified hydrogen storage alloy active material has less surface roughness than an unmodified electrode after repeated charge-discharge cycles.

46. The electrochemical cell of claim 11 wherein the surface of the negative electrode of modified hydrogen storage alloy active material is less catalytic to self discharge reactions than an unmodified electrode.

47. The electrochemical cell of claim 11 wherein the surface of the negative electrode of modified hydrogen storage alloy active material has a lower surface content of high conductivity material than an unmodified electrode and is less catalytic to self discharge reactions than an unmodified electrode.

48. The electrochemical cell of claim 47 wherein the high conductivity material is nickel, and the modified hydrogen storage alloy inhibits the increase of nickel in the surface of the electrode.

49. A reversible, negative, electrochemical hydrogen storage electrode adapted for use in a sealed, rechargeable hydrogen storage battery, said electrode comprising a modified, multiphase, multicomponent, reversible electrochemical hydrogen storage alloy formed of titanium, vanadium, zirconium, nickel, and chromium, having the composition $(Ti_{2-x}Zr_xV_{4-y}Ni_y)_{1-z}Cr_z$ where $0.0 < x < 1.5$, $0.6 < y < 3.5$, and z is an effective amount less then 0.20,
    said hydrogen storage alloy being capable of electrochemically charging and discharging hydrogen in aqueous alkaline media.

50. The reversible, negative, electrochemical hydrogen storage electrode of claim 49 wherein the modified hydrogen storage alloy active material has the composition $V_{33}Ti_{13}Zr_{14}Ni_{33}Cr_7$.

51. The reversible, negative, electrochemical hydrogen storage electrode of claim 49 wherein the modified hydrogen storage alloy active material has the composition $V_{27}Ti_{17}Zr_{16}Ni_{35}Cr_5$.

52. The reversible, negative, electrochemical hydrogen storage electrode of claim 49 wherein the modified hydrogen storage alloy adtive material has the composition $V_{25}Ti_{17}Zr_{16}Ni_{40}Cr_2$.

53. The reversible, negative, electrochemical hydrogen storage electrode of claim 49 wherein the modified hydrogen storage alloy active material has the composition $V_{23}Ti_{17}Zr_{16}Ni_{40}Cr_4$.

54. The reversible, negative, electrochemical hydrogen storage electrode of claim 49 wherein the modified hydrogen storage alloy active material has the composition $V_{22}Ti_{16}Zr_{16}Ni_{39}Cr_7$.

55. The reversible, negative, electrochemical hydrogen storage electrode of claim 49 wherein the modified hydrogen storage alloy active material further comprises a second modifier chosen from the group consisting of at least one of copper, iron, manganese, and cobalt.

56. The reversible, negative, electrochemical hydrogen storage electrode of claim 49 wherein the modified hydrogen storage alloy active material further comprises a hydrogen storage component chosen from the group consisting of at least one of magnesium, calcium, lanthanum, niobium, silicon, and hafnium.

57. The reversible, negative, electrochemical hydrogen storage electrode of claim 49 wherein the modified, multiphase, multicomponent, reversible electrochemical hydrogen storage alloy comprises hydrogen storage alloy multicomponent phases capable of reversibly storing hydrogen, wherein at least one of the components of the multicomponent hydrogen storage phase is soluble in the electrolyte, and wherein the modifier inhibits the loss of the soluble component into the strongly ionic, aqueous media.

58. The reversible, negative, electrochemical hydrogen storage electrode of claim 57 wherein the soluble component is chosen from the group consisting of vanadium, niobium, aluminum, and tantalum.

59. The reversible, negative, electrochemical hydrogen storage electrode of claim 58 wherein the soluble component is vanadium.

* * * * *

UNITED STATES PATENT AND TRADEMARK OFFICE
CERTIFICATE OF CORRECTION

PATENT NO. : 4,728,586

DATED : March 1, 1988

INVENTOR(S) : Srini Venkatesan, Benjamin Reichman, Michael A. Fetcenko

It is certified that error appears in the above-identified patent and that said Letters Patent is hereby corrected as shown below:

In column 11, line 22, after "above" insert --and the resulting subscripts are normalized to their respective atomic fractions so as to total 100% of the constituent alloy elements within the brackets--.

In claim 1, column 24 line 64, "$(Ti_{2-x} Zr_x V_{4-y} Ni_y)_z Cr_{1-z}$" is replaced by --$(Ti_{2-x} Zr_x V_{4-y} Ni_y)_{1-z} Cr_z$--.

In claims 3 and and 11, column 25, lines 12 and 55, "$Ti_{2-x} Zr_x V_{4-y} Ni_y)_{1-z} Cr_z$" is replaced by --$(Ti_{2-x} Zr_x V_{4-y} Ni_y)_{1-z} Cr_z$--.

Signed and Sealed this

Seventh Day of January, 1992

Attest:

HARRY F. MANBECK, JR.

*Attesting Officer*  *Commissioner of Patents and Trademarks*